(12) United States Patent
Lee et al.

(10) Patent No.: US 8,863,247 B2
(45) Date of Patent: Oct. 14, 2014

(54) LDAP SECURITY DOMAIN DATA STORAGE

(75) Inventors: Ade Lee, Cary, NC (US); Christina Fu, Saratoga, CA (US); Andrew Wnuk, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 947 days.

(21) Appl. No.: 12/571,386

(22) Filed: Sep. 30, 2009

(65) Prior Publication Data

US 2011/0078772 A1    Mar. 31, 2011

(51) Int. Cl.
*G06F 7/04*     (2006.01)
*G06F 15/16*    (2006.01)
*G06F 17/30*    (2006.01)
*H04L 29/06*    (2006.01)

(52) U.S. Cl.
CPC .................................. *H04L 63/0823* (2013.01)
USPC ............................................................ 726/5

(58) Field of Classification Search
CPC .......... H04L 29/06; G06F 21/00; G06F 21/31
USPC ............................................................ 726/5
See application file for complete search history.

(56) References Cited

U.S. PATENT DOCUMENTS

| | | | |
|---|---|---|---|
| 7,076,691 B1* | 7/2006 | Dobberpuhl et al. ........... | 714/13 |
| 7,617,257 B2* | 11/2009 | Sathyanarayan et al. ............. | 1/1 |
| 7,827,317 B2* | 11/2010 | Baldwin et al. ............... | 709/249 |
| 7,996,674 B2* | 8/2011 | Jain ................................. | 713/168 |
| 2003/0037234 A1* | 2/2003 | Fu et al. ......................... | 713/158 |
| 2003/0115456 A1* | 6/2003 | Kapoor .......................... | 713/156 |
| 2007/0268515 A1* | 11/2007 | Freund et al. ................. | 358/1.15 |

\* cited by examiner

*Primary Examiner* — Dant Shaifer Harriman
(74) *Attorney, Agent, or Firm* — Lowenstein Sandler LLP (57) ABSTRACT

A Security Domain Access System (SDAS) provides highly available security domain data. The SDAS receives a request pertaining to a security domain. The request includes credentials for accessing a security domain manager server. The SDAS selects one of a plurality of security domain manager servers to process the request based on the credentials and the availability of each of the plurality of security domain manager servers. The SDAS forwards the request to the selected security domain manager server.

22 Claims, 7 Drawing Sheets

LDAP SECURITY DOMAIN DATA STORAGE

TECHNICAL FIELD

Embodiments of the present invention relate to certificate systems. Specifically, the embodiments of the present invention relate to facilitating certificate subsystem access to the security domain information from multiple domain manager subsystems.

BACKGROUND

A certificate system provides a security framework to ensure that network resources are accessed by authorized users. The certificate system is capable of generating digital certificates (certificates) for different users to verify the identity of a presenter. The certificate system can include interoperating subsystems to perform various Public Key Infrastructure (PKI) operations, such as issuing, renewing, suspending, revoking, archiving and recovering keys, publishing Certificate Revocation Lists (CRLs), verifying certificate status, and managing the certificates that are needed to handle strong authentication and secure communications. The certificate system can include a Certificate Authority (CA) subsystem to issue and revoke certificates, a Key Recovery Authority (KRA) subsystem, also known as a Data Recovery Manager (DRM) subsystem, to recover lost keys, an Online Certificate Status Responder (OCSP) subsystem to verify whether a certificate is valid, a Registration Authority (RA) subsystem to accept certificate requests and verify whether a request should be approved, a Token Key Service (TKS) subsystem to format tokens (e.g., USB storage device, key fob) and process certificates on a token, and a Token Processing System (TPS) to manage certificates on tokens.

Each certificate subsystem belongs to a security domain. There can be multiple security domains in a certificate system. A security domain is a registry of certificate subsystems that provide PKI services. For example, a CA subsystem registers information about itself with a security domain so users of PKI services can find other services by inspecting the registry.

Typically, a security domain has a single domain manager to keep track of which certificate subsystems belong to a security domain. The domain manager can add a certificate subsystem to a security domain and can remove a certificate subsystem from the security domain. When a certificate subsystem is installed, the subsystem undergoes a registration process and contacts the domain manager as part of its registration process to request to join a security domain. The domain manager, however, can be a bottleneck in the registration process if the domain manager is offline. A certificate subsystem can also contact the domain manager and request to be removed from a security domain. The domain manager, however, may not have the bandwidth to handle numerous security domain requests, leaving some requests unprocessed.

The single domain manger is usually the first certificate authority (CA) subsystem (root CA subsystem) that is installed in a certificate system. Usually only a limited number of users (system administrators) have the credentials to access the domain manager. The process to add or remove certificate subsystems or change certificate subsystem security domain data, therefore, is also limited by the number of system administrators that have the credentials to access the domain manager. In addition, typically the single domain manager manages the topology data for a security domain. The topology data can include a list of subsystems in the security domain and the information for each subsystem. The access to the topology data, therefore, is also limited to the system administrators that have the credentials to access the domain manager. As a result, only a limited number of system administrators can view the topology data for a security domain. A root CA subsystem is the single domain manager that can process view, add, remove, and change requests; therefore, the root CA subsystem is under a heavy load of traffic and may not always be available. The current state of the art, therefore, does not provide a way to process security domain requests when a user (system administrator) does not have the credentials to access the security domain manager and when the security domain manager is not available.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for providing the high availability of the security domain information. A Security Domain Access System (SDAS) receives a request pertaining to a security domain. The request can include credentials for accessing a security domain manager server. The SDAS selects one of a plurality of security domain manager servers to process the request based on the credentials and the availability of each of the plurality of security domain manager servers. The SDAS forwards the request to the selected security domain manager server. Each domain manager in a security domain maintains an LDAP-based database and includes a Security Domain Management System (SDMS) to manage security domain data using the LDAP-based database. The SDMS receives a request from a certificate subsystem server to add or remove the certificate subsystem from the security domain. The SDMS changes the security domain data in its LDAP-based database to add or remove the certificate subsystem from the security domain and replicates the change to the LDAP-based database of the other domain managers in the security domain. The SDMS can also receive a request from a user (e.g., system administrator) to view the topology of the security domain.

Figure 1:
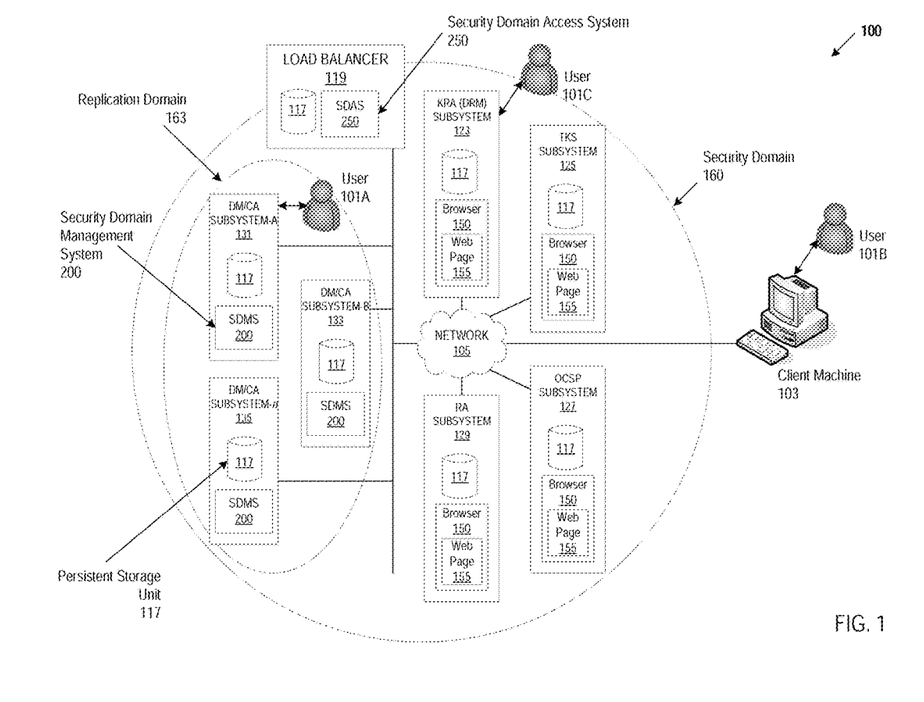
FIG. 1 illustrates an exemplary network architecture in which embodiments of the present invention may operate.

FIG. 1 illustrates an exemplary network architecture on which embodiments of the present invention can be implemented. A certificate system 100 provides PKI services to ensure that network resources are accessed by authorized users. The various PKI services can be performed by different certificate subsystems that interoperate together to provide the PKI services. For example, a Certificate Authority (CA) subsystem 131 issues certificates to users and revokes certificates. A Registration Authority (RA) subsystem 129 accepts certificate requests and verifies whether a request should be approved. A Key Recovery Authority (KRA) subsystem 123, also known as a Data Recovery Manager (DRM) subsystem, recovers lost keys. An Online Certificate Status Responder (OCSP) subsystem 127 verifies whether a certificate is valid. A Token Key Service (TKS) subsystem 125 formats tokens (e.g., USB storage device, key fob) and processes certificates on a token. Each certificate subsystem can be any type of computing device including desktop computers, laptop computers, hand-held computers, or similar computing device. A certificate subsystem can be duplicated, or cloned, so that one or more clones are set up in an identical manner to create a high availability certificate system 100. For example, the first CA subsystem 131 (root-CA subsystem) installed in a certificate system 100 can be cloned 133,135 such that the certificate system 100 has more than one CA subsystem 131-135. The high availability certificate system 100 can include hundreds of clones 133,135 of the root-CA subsystem 131.

The certificate subsystems 123-135 are coupled to a network 105. The network 105 can be a wide area network (WAN), such as the Internet, a local area network (LAN), such as an intranet within a company, a wireless network, a mobile communications network, or a similar communication system. The network 105 can include any number of networking and computing devices such as wired and wireless devices.

Certificate subsystems (123-135) can be grouped together in a security domain 160. There can be multiple security domains 160 in a certificate system 100. A security domain is a registry of certificate subsystems that provide PKI services. Security domain managers maintain the registry. For example, each subsystem (123-135) registers information about itself with a security domain manager so users 101A-C of PKI services can find other services by inspecting the registry.

A security domain manager manages the security domain. A CA subsystem can be a domain manager (DM). There is more than one domain manager in a security domain. There can be a root-CA subsystem 131 which is typically the first CA subsystem configured for a certificate system. The root-CA subsystem can be the root-DM. A user 101A can use the root-DM 131 to create a security domain 160. For example, a system administrator can use a configuration tool on the root-DM 131 to create a security domain by creating a registry to store the subsystem data for each subsystem that registers with the security domain. Although not illustrated, each certificate subsystem 123-135 includes a web-based configuration tool 155 accessible by a user using a general purpose browser 150 or a specialized application. The root-DM 131 can be cloned such that each clone 133,135 is a domain manager for the security domain 160. Certificate system 100 includes a root-DM 131 and DM clones 133,135.

Each DM 131-135 maintains the registry by storing security domain data in a persistent storage unit 117. The security domain information can include a list of the certificate subsystems 123-135 that belong to the security domain 160 and subsystem data for each subsystem. A persistent storage unit 117 can be a local storage unit or a remote storage unit. Persistent storage units can be a magnetic storage unit, optical storage unit, solid state storage unit or similar storage unit. Persistent storage units can be a monolithic device or a distributed set of devices. A 'set,' as used herein, refers to any positive whole number of items including one.

Each DM 131-135 can store the security domain data using a directory that stores all of the information in a single, network-accessible repository. The directory can be a directory that uses a Lightweight Directory Access Protocol (LDAP) protocol. However, it is expressly contemplated that any appropriate directory and directory service can be enhanced for use in accordance with the allocation architecture described herein. The high availability certificate system 100 can communicate with an internal LDAP-based database securely through SSL client authentications.

A domain manager 131-135 can add (register) a certificate subsystem to the security domain 160 and can remove a certificate subsystem from a security domain 160 by either adding or removing data from the security domain data stored in an LDAP-based database. The domain manager 131-135 can change the security domain data for a certificate subsystem in the security domain 160 (e.g., update the information of the certificate subsystem). The high availability certificate system 100 provides fail over support by ensuring that security domain requests made to the DMs 131-135 (e.g., registration request to add or removal request to remove a subsystem from a security domain) are processed even if one of the DMs 131-135 is unavailable. In one embodiment a load balancer 119 receives security domain request from a subsystem 123-127 and directs the security domain request appropriately between the multiple DMs 131-135. The load balancer can be a networking hardware device, such as a multilayer switch, gateway, a DNS server, etc. In the event that a DM 131-135 fails, the load balancer 119 can transparently redirect all security domain requests to a DM 131-135 that is still operational.

The load balancer 119 includes a Security Domain Access System (SDAS) 250 to facilitate access to the security domain data from multiple domain managers. The load balancer also includes a persistent storage unit to store security domain data that includes a list of a plurality of security domain managers for a security domain. The SDAS 250 is coupled to the persistent storage unit to receive a request that pertains to a security domain. The SDAS 250 selects one of the DMs 131-135 to process the request based on the availability of the DMs 131-135 and the credentials provided by a user 101A-C. The SDAS 250 forwards the request to the selected DM. For example, a user 101 C removes the KRA subsystem 123 from the security domain 160 and uses the web-based configuration page 155 on the KRA subsystem 123 to contact the root-DM 131 or a clone DM 133,135 to send the DM a removal request. The root-DM 131 and the clone DM 133 may be off line, but the clone DM 135 may be available to process the removal request. The load balancer 119 receives the requests from the KRA subsystem 123, determines the root-DM 131 and the clone DM 133 are off line, and redirects the request to clone DM 135. In another example, a user 101 C installs a KRA subsystem 123 and uses the web-based configuration page 155 on the KRA subsystem 123 to contact the root-DM 131 or a clone DM 133,135 to send the DM a registration request that the KRA subsystem 123 join the security domain 160. The user 101 C, however, may be a system administrator that does not have the credentials to access the root-DM 131 and only has the credentials to access a clone DM 133,135. The user 101C can contact a clone DM 133,135 to add the KRA subsystem 123 to the security domain 160.

A domain manager can also provide a user (e.g., a system administrator) access to view the topology of the security domain (a list of the subsystems in the security domain and information for each subsystem). A user 101 A, C can view the security domain topology using a certificate subsystem 123-135 or a user 101 B can use a client machine 103. For example, a user can use a web-based configuration page 155 on the KRA subsystem 123 to contact the root-DM 131 or a clone DM 133,135 to send the DM a viewing request. A client machine 103 can be any type of computing device including desktop computers, laptop computers, hand-held computers, or similar computing device. The client machine 103 may have a tool (not shown) to enable a user to access a DM 131-135 and view the topology data of a security domain.

Each DM 131-135 includes a Security Domain Management System (SDMS) 200 to provide high availability of the security domain data and to automatically manage the security domain data. Each DM 131-135, thus, is capable of processing registration requesting, removal requests, and viewing requests. A SDMS 200 receives a request pertaining to a security domain. The request can be a registration (add) request, removal request, update (change) request, or viewing request. The SDMS 200 changes the security domain data in its LDAP-based database based on the request (e.g., registration or removal request) and replicates the changes made to the security domain data to the LDAP-based databases of the other DMs in a replication domain. A replication domain 163 defines a group of DMs that replicate data to each other. For example, the root-DM 131 and the clone DMs 133,135 are part of a replication domain 163. When a DM 131-135 changes the security domain data (e.g., add or remove a certificate subsystem) in its corresponding persistent storage unit 117, the changes are replicated to the other DMs.

Embodiments of the invention add the benefit of facilitating access to the security domain data from multiple domain managers and automatically managing the security domain data among the multiple domain managers. A high availability certificate system 100 provides fail over support by ensuring that security domain requests are processed even if one of the domain managers is unavailable or if a user (e.g., system administrator) does not have the credentials to access some of the domain managers (e.g., root-DM).

Figure 2:
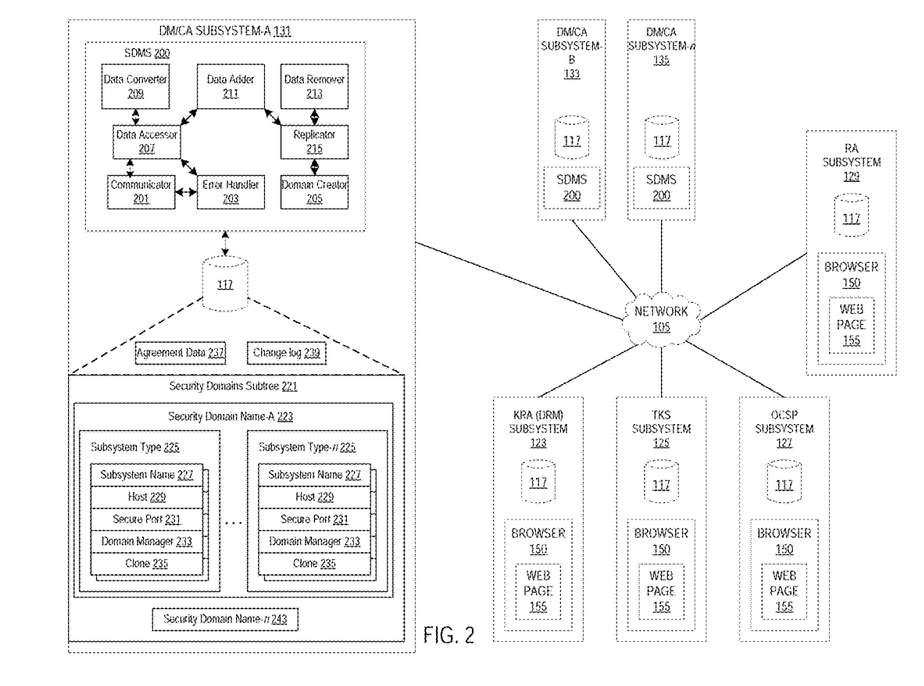
FIG. 2 illustrates a diagrammatic representation of a security domain management system, in accordance with one embodiment of the present invention.

FIG. 2 is a block diagram illustrating an embodiment of a Security Domain Management System (SDMS) 200 for automatically providing highly available security domain data and for automatically managing the security domain data. Each Domain Manager (DM) 131-135 includes a SDMS 200, and a persistent storage unit 117 to store security domain data. The security domain data in each persistent storage unit can be stored in an LDAP-based database. DM 131 is a root-DM and DM-B, n 133,135 are clones of the root-DM 107. Entries in each LDAP- based database 117 can be replicated to the LDAP-based database of the other DMs 131-135 in a replication domain. A replication domain is a group of subsystems (e.g., DM servers) that replicate data to each other. For example, DM-A, B, n 131-135 are in a replication domain.

A SDMS 200 includes a domain creator 205, a communicator 201, an error generator 203, a data retriever 207, a data converter 209, a data adder 211, a data remover 213, and a replicator 215. This division of functionality is presented by way example for sake of clarity. One skilled in the art would understand that the functionality described could be combined into a monolithic component or sub-divided into any combination of components.

A domain creator 205 creates a new security domain. The domain creator 205 creates a security domain by creating a registry (security domain data) to store a list of the certificate subsystems in the security domain and subsystem data for each certificate subsystem. The security domain data can be stored in an LDAP-based database 117. The domain creator 205 can store the data in a security domain subtree 221 (e.g., "ou=Security Domains, ${rootbaseDN}"). The security domain subtree 211 can include a container for each security domain. For example, the security domain subtree 211 includes a container to Security Domain Name-A 223 and a container for Security Domain Name-n 243.

Where a certificate subsystem 123-129 is a new system, the certificate subsystem undergoes a registration process. As part of the registration process, the certificate subsystem 123-129 contacts one of the DMs 131-135 to register with a security domain. A communicator 201 receives credentials from a user (e.g., system administrator) to access the security domain data. A user can send the credentials (e.g., a user name and password) to the communicator 201 over a network 105 using, for example, a configuration tool on a certificate subsystem 123-129.

An error generator 203 generates an error message and sends the error message to a certificate subsystem 123-129. For example, the communicator 201 may receive an incorrect user name or an incorrect password. The error message can also indicate that the security domain which the system administrator attempts to access does not exist in the LDAP-based database 117.

A data retriever 207 pulls data from an LDAP-based database. The data retriever 207 receives a request to access the security domain data for a security domain. The request can be from a system administrator to view the topology of the security domain. The request can be from a system administrator as part of a registration process of a certificate subsystem to view the other subsystems in the security domain. The request includes a name of the security domain that a system administrator attempts to access. The data retriever 207 can search the LDAP-based database 117 of the DM 131 for a container having a security domain name (e.g., security domain name 223,243) that matches the security domain name in the request and retrieves the security domain data.

A data converter 209 converts the security domain data retrieved by the data retriever 207 into XML data and sends the XML data to the certificate subsystem 123-127 over network 105. Each certificate subsystem 123-127 includes a general purpose browser 150 or a specialized application to receive the XML data and to render the XML data generated by the data converter 209 in a web page 155. A user (e.g., system administrator) can view the security domain data using as the web page 155.

A system administrator may install a new certificate subsystem in the certificate system. A data adder 211 receives a security domain request from a certificate subsystem 123-127 that is a registration request to add the certificate subsystem 123-127 to a security domain. The data adder 211 changes the security domain data in the LDAP-based database 117 of the DM 131 based on the data in the registration request. The registration request includes system information of the certificate subsystem 123-127 such as a type of subsystem for the certificate subsystem 123-127, a subsystem name, a host name, a secure port number, data indicating whether the certificate subsystem is a domain manager, and data indicating whether the certificate subsystem is a clone of a subsystem. The data adder 211 adds an entry, which includes the system information of the certificate subsystem 123-127, to the LDAP-based database 117 of the DM 131 for the certificate subsystem 123-127.

A system administrator may change the security domain of a certificate subsystem or remove a certificate subsystem from the certificate system. A data remover 213 receives a removal request from a certificate subsystem 123-127 to remove the certificate subsystem 123-127 from a security domain. The data remover 213 changes the security domain data in the LDAP-based database 117 of the DM 131 based on the data in the removal request. The removal request includes system information of the certificate subsystem 123-127 such as a type of subsystem for the certificate subsystem 123-127, a subsystem name, a host name, and a secure port number. The data remover 213 can search the LDAP-based database 117 of the DM 131 for an entry that corresponds to the system information in the removal request and deletes the matching entry from the LDAP-based database 117.

A replicator 215 replicates the security domain data, including changes (e.g., adding an entry by the data adder 211, deleting an entry by the data remover 213) made to the security domain data, to the LDAP-based database for each of the other DMs in the replication domain. Each DM 131-135 is responsible for recording changes made to the LDAP-based database it manages. When the security domain data is changed, for example, an entry is added to the security domain data or an entry is deleted from the security domain data, the replicator 215 records the change in a change log 239. The replicator 215 can manage replication using replication agreements between DMs 131-135. A replication agreement describes replication between two servers. The agreement is configured and stored on the DM that makes a change to the data in an LDAP-based database that is to be replicated. The agreement can be stored as agreement data 237. A DM stores a replication agreement for each DM it has a relation with. For example, DM 131 stores a replication agreement for DM 133, and a replication agreement for DM 135 in agreement data 237. Each replication agreement identifies the database or fractions of the database to replicate and the DM in the replication domain to which the data is pushed.

The domain creator 205, the communicator 201, the error generator 203, the data retriever 207, the data converter 209, the data adder 211, the data remover 213, and the replicator 215 can be implemented as hardware, computer-implemented software, firmware or a combination thereof. In one embodiment, the domain creator 205, the communicator 201, the error generator 203, the data retriever 207, the data converter 209, the data adder 211, the data remover 213, and the replicator 215 comprise instructions stored in memory 504 that cause a processing device 502 in FIG. 5 described in greater detail below to perform the functions of the domain creator 205, the communicator 201, the error generator 203, the data retriever 207, the data converter 209, the data adder 211, the data remover 213, and the replicator 215.

Figure 3:
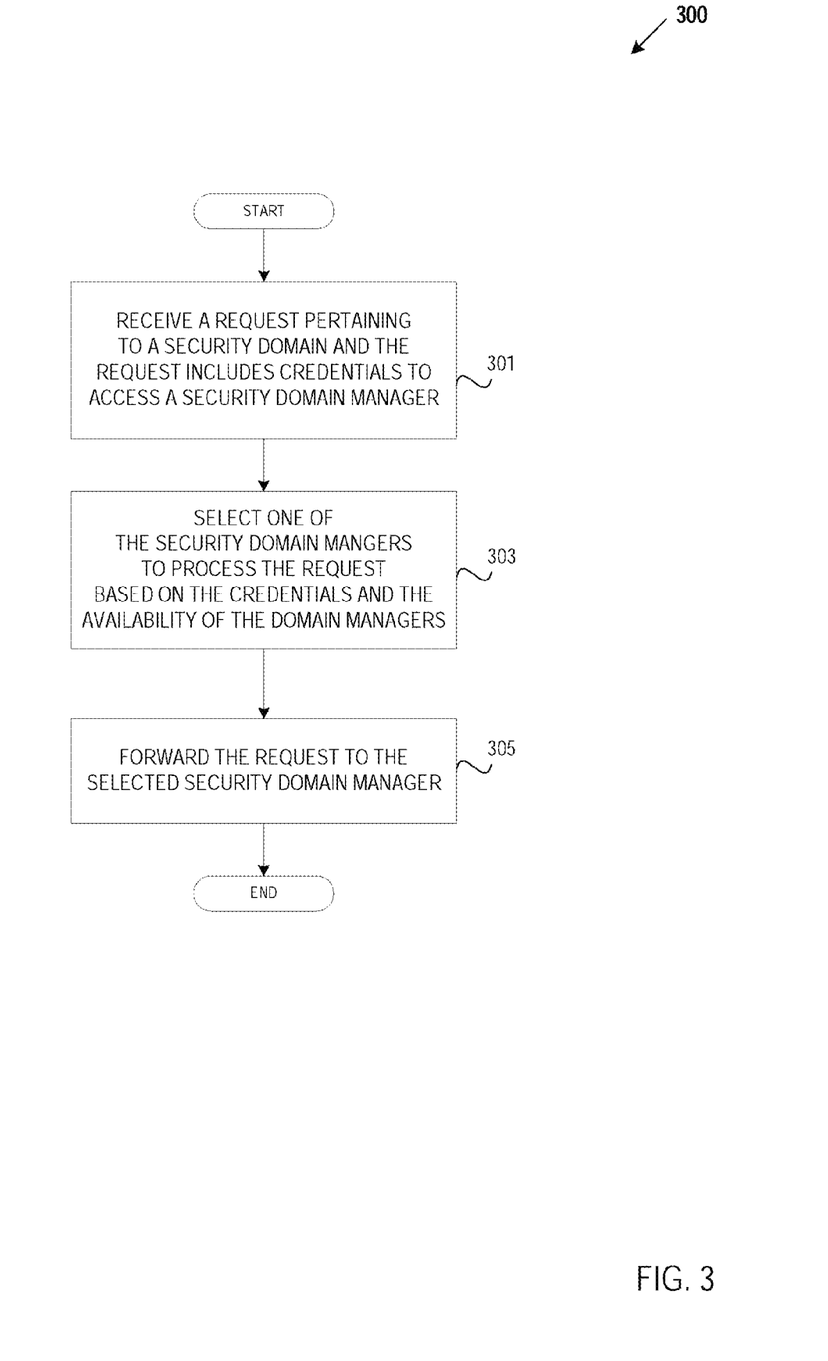
FIG. 3 is a flowchart which illustrates an embodiment of a method for providing the high availability of the security domain information and for automatically managing security domain information.

FIG. 3 is a flowchart which illustrates an embodiment of a method 300 for providing the high availability of the security domain information and for automatically managing security domain information. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the SDAS 250 in a load balancer 250 of FIG. 1.

In one embodiment, this method can be initiated by a load balancer receiving a request pertaining to a security domain at block 301. The request can be a registration (add) request, removal request, update (change) request, or viewing request. The request can include credentials to access a security domain manager. At block 303, the load balancer selects one of the security domain managers to process the request based on the credentials and availability of the domain managers. The load balancer can access security domain data that includes a list of a plurality of security domain managers for a security domain in a persistent storage unit. For example, a system administrator may request access to view a topology of the security domain and the system administrator may not have the credentials (e.g., user name and password) for a root-DM. The system administrator may have the credentials for the clone DMs. The load balancer can determine that one of the clone DMs is off line and select a clone DM that is on line. At block 305, the load balancer forwards the request to the selected security domain manager. For example, the load balancer can forward the request to view the security domain topology to the clone DM that is on line.

Figure 4:
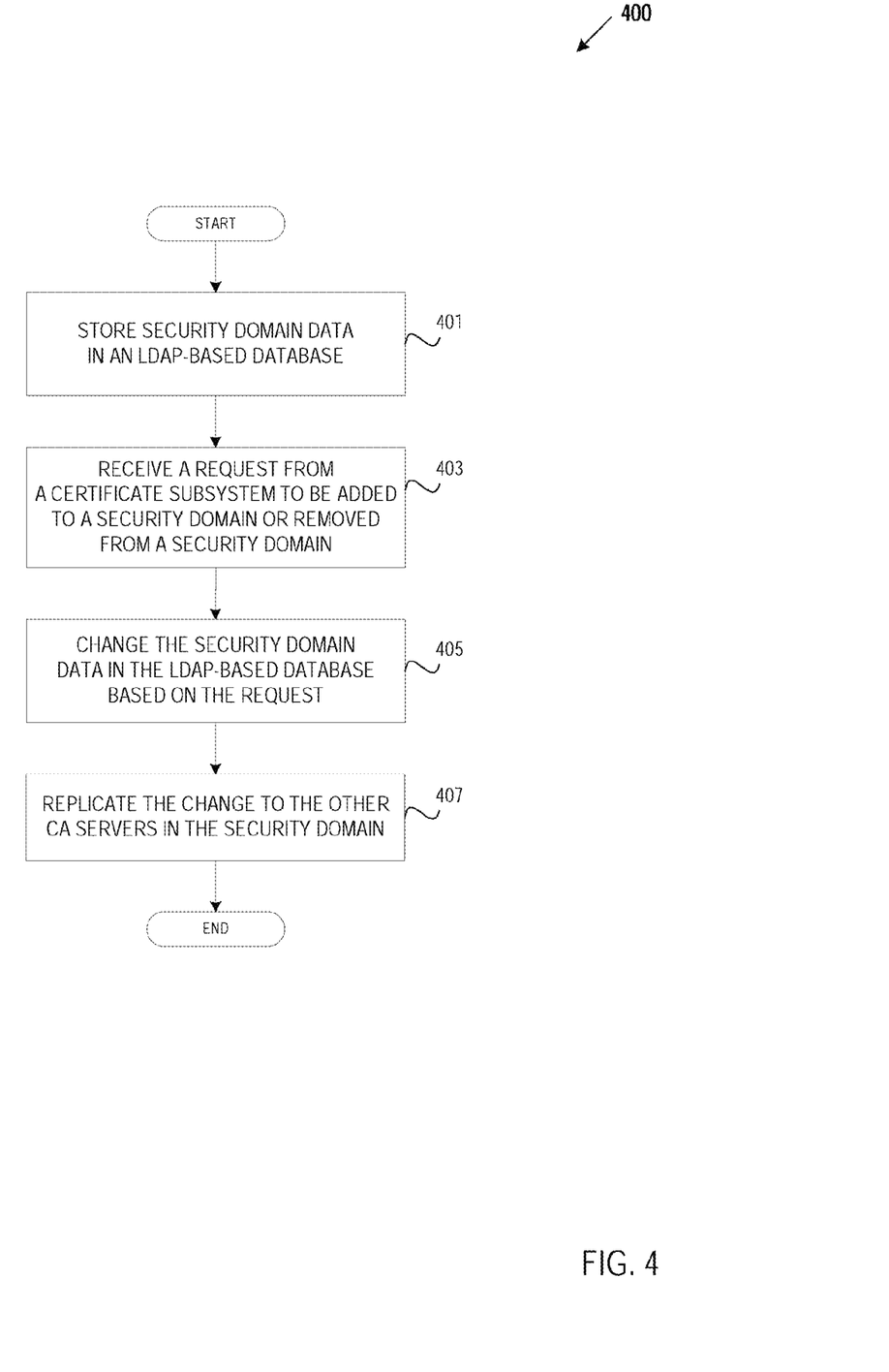
FIG. 4 is a flowchart which illustrates an embodiment of a method for providing the high availability of the security domain information and for automatically managing security domain information.

FIG. 4 is a flowchart which illustrates an embodiment of a method 400 for providing the high availability of the security domain information and for automatically managing security domain information. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the SDMS 200 in a DM 133-135 of FIGS. 1 and 2.

In one embodiment, this method can be initiated by a DM server storing security domain data for a security domain in an LDAP-based database at block 401. A security domain can have root-DM server and clones of the root-DM server. Each DM server has a replication agreement for each of the other DM servers in the security domain to create a replication domain. A replication domain is a group of servers (e.g., DM servers) that replicate data to each other. Each DM server maintains an LDAP-based database. The security domain data stored in each LDAP-based database is replicated to the other LDAP-based databases when the security domain data is changed in any other LDAP-based databases.

At block 403, the DM server receives a security domain request from a certificate subsystem. The security domain request can be a request to add the certificate subsystem to a security domain, to remove the certificate subsystem from a security domain, or to update the certificate subsystem information for a subsystem in a security domain. At block 405, the DM server changes the security domain data in its corresponding LDAP-based database to add the certificate subsystem to a security domain or to remove the certificate subsystem from a security domain. At block 407, the DM server replicates the change made to its LDAP-based database to the LDAP-based database of each of the other DM servers in the replication domain and the method completes.

Figure 5A:
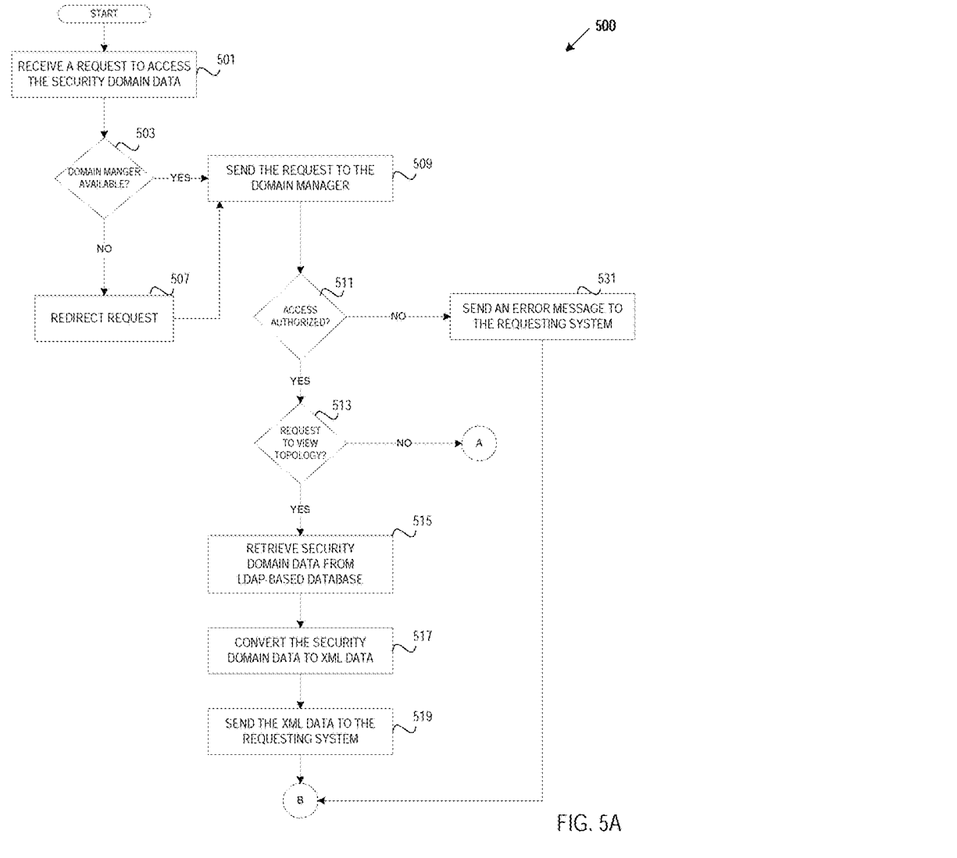
FIGS. 5A-5B is a flowchart which illustrates an embodiment of a method for providing the high availability of the security domain information and for automatically managing security domain information.
Figure 5B:
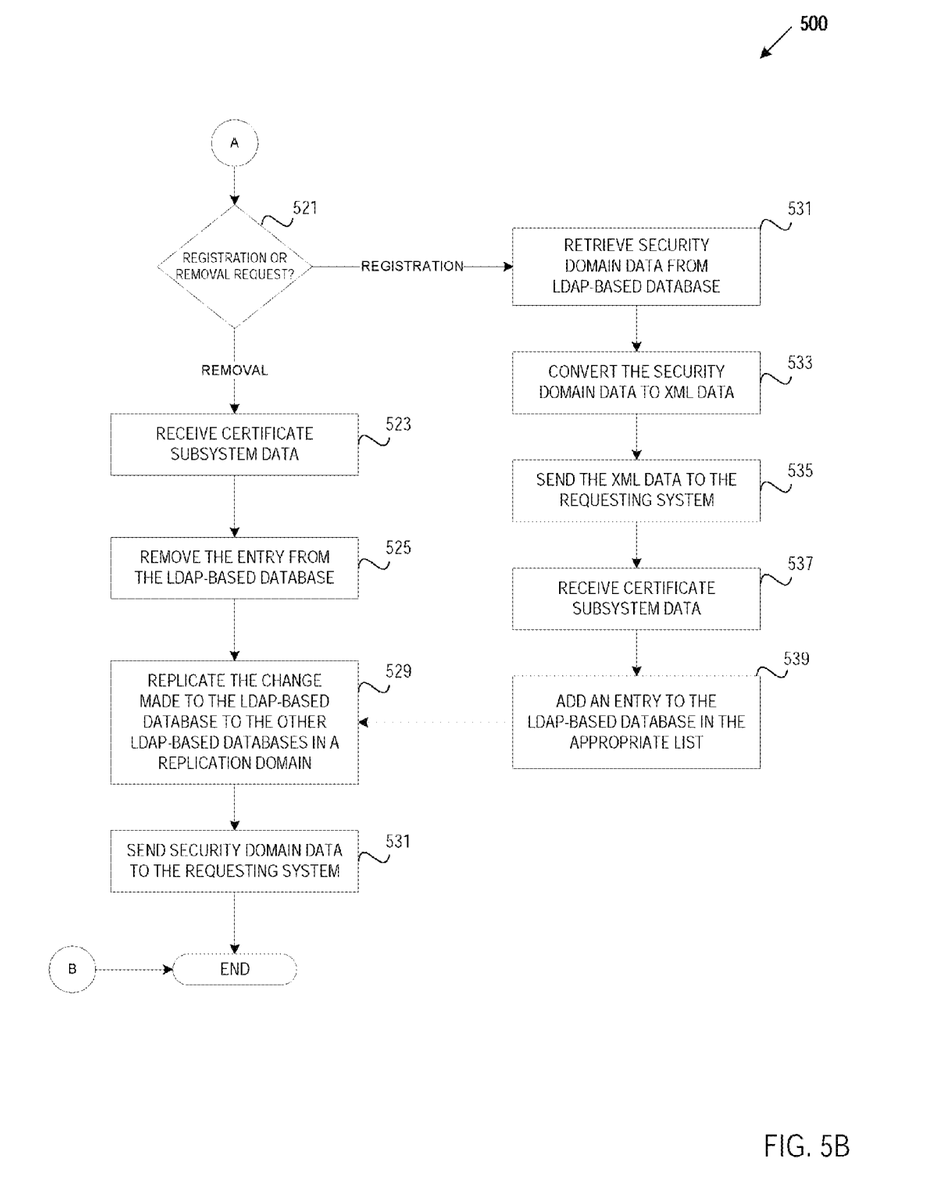

FIGS. 5A-5B is a flowchart which illustrates an embodiment of a method 500 for providing the high availability of the security domain information and for automatically managing security domain information. As compared to prior solutions where requests to view, update, add or remove security domain data were processed by a single root-CA (root-DM), creating even more traffic for the root-CA, the security domain data is accessible by any DM in the security domain. A user (e.g., system administrator) does not have to access a root-DM, but can access any DM to view topology information. In some embodiments, a user can access any DM without going through a load balancer. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by the SDAS 250 on a load balancer in FIG. 1 or SDMS 200 on a DM server 131-135 of FIGS. 1 and 2.

In one embodiment, this method can be initiated at block 501 by a load balancer receiving a request from a certificate subsystem to access the security domain data. A system administrator may specify which DM server to contact for access to the security domain data. For example, the request can include data that identifies a DM server. The identified DM server can be a DM server that processed a previous request for the requesting subsystem. For example, a KRA subsystem that is part of a security domain is sending a request to update its subsystem information. The KRA subsystem can include data in the request that identifies the DM server that previously processed the registration of the KRA subsystem to join the security domain. At block 503, the load balancer determines whether the DM server is available. For example, the DM server may be off line. If the DM server is not available (block 503), the load balancer can redirect the request to another DM server at block 507. If the DM server is available (block 503), the load balancer send the request to the DM server at block 509.

At block 511, the DM server determines whether the request is authorized. A system administrator can send the DM server credentials (e.g., user name and password) to access the security domain data from the DM server. If the DM server does not receive the proper credentials (block 511), the DM server sends an error message to the certificate subsystem at block 531 and the method completes. If the DM server receives the proper credentials (block 511), the DM server determines whether the request is a request to view the topology of the security domain.

If the request is a viewing request (block 513), the DM server retrieves the security domain data from its LDAP-based database at block 515. Prior to retrieving the security domain data, the DM server can determine whether the security domain exists. The user (e.g., system administrator) can include the name of the security domain that the user is requesting to view in the request. The LDAP-based database has a container for each security domain name. The DM sever can search the security domain data stored in its LDAP-based database for a security domain name that matches the security domain name that was received in the request. If the DM server determines that the security domain name does not exist, the DM server can send an error message to the certificate subsystem and the method completes. If the DM server determines that the security domain name does exist, the DM server retrieves the security domain data from its LDAP-based database at block 515. At block 517, the DM server converts the security domain data to XML data. The data is converted to XML data to be displayed in a web page accessible by the user requesting to view the data. At block 519, the DM server sends the XML data to the certificate subsystem. The certificate subsystem receives the XML data and a browser in the certificate subsystem can render the XML data generated by the DM server in a web page to be view by the user.

If the request is a not viewing request (block 513), the DM server determines whether the request is a registration or removal request (block 521). The request can also be a change request to change the data of a certificate subsystem in a security domain. A registration request is a request to register the certificate subsystem as part of the security domain. A removal request is a request to delete the certificate subsystem from the security domain. If the request is a registration request (block 521), the DM server retrieves the security domain data from its LDAP-based database at block 531. At block 533, the DM server converts the security domain data to XML data. The data is converted to XML data to be displayed in a web page accessible by the user requesting to view the data. At block 535, the DM server sends the XML data to the certificate subsystem. The certificate subsystem receives the XML data and a browser in the certificate subsystem can render the XML data generated by the DM server in a web page to be view by the user. A system administrator can view a list of the existing certificate subsystems in the security domain and configure the certificate subsystem that is being added to the security domain accordingly. For example, a system administrator is installing a Registration Authority (RA) subsystem and selects a Certificate Authority (CA) subsystem from the list of CAs in the security domain to process certificates associated with the RA subsystem.

At block 537, the DM server receives information about the certificate subsystem being added to the security domain. The subsystem information can include the type of certificate subsystem. For example, the certificate subsystem can be a Certificate Authority (CA) subsystem, a Key Recovery Authority (KRA) subsystem (also known as a Data Recovery Manager (DRM) subsystem), a Recovery Authority (RA) subsystem, an On-line Certificate Status Responder (OCSP) subsystem, a Token Key Service (TKS) subsystem, or a Token Processing System (TPS). The information can include the subsystem name, a host name, a secure port number, data indicating whether the certificate subsystem is a domain manager server, and data indicating whether the certificate subsystem is a clone of a subsystem.

At block 539, the DM server adds an entry to its LDAP-based database to add the certificate subsystem to the security domain. The DM server adds the entry to a list that corresponds to the certificate subsystem's type of subsystem. The LDAP-based database has a container for each subsystem type (e.g., CAList, KRAList, TPSList, etc.). For example, at block 537, the DM server receives information that the certificate subsystem is a RA subsystem. At block 539, the DM server adds an entry to the container for the RA subsystem type. The entry includes the subsystem name, a host name, a secure port number, data indicating whether the certificate subsystem is a domain manager server, and data indicating whether the certificate subsystem is a clone of a subsystem. The DM server replicates the entry to the LDAP-based database of each of the other DM servers in the replication domain at block 529.

At block 531, the DM server sends security domain data to the requesting subsystem. The security domain data includes identifying data for the DM server that processed the request. The requesting certificate subsystem stores the security domain data in a persistent storage unit for future removal requests, update requests, or any other purpose. The requesting certificate subsystem can include data in a request that identifies the DM server processed a previous request (e.g., registration request).

If the DM server determines that the security domain request is a removal request (block 521), the DM server receives information about the certificate subsystem being removed from the security domain. At block 523, the DM server deletes the entry for the certificate subsystem from its LDAP-based database to remove the certificate subsystem from the security domain. The DM server can search the LDAP-based database for an entry that matches the subsystem information in the removal request and the delete the matching entry.

At block 529, the DM server replicates the change made to its LDAP-based database to the LDAP-based database of each of the other DM servers in the replication domain and the method completes. For example, the DM server replicates the removal of a certificate subsystem from the security domain to the other LDAP-based databases in the replication domain. In another example, the DM server replicates the addition of a certificate subsystem to the security domain to the other LDAP-based databases in the replication domain.

Figure 6:
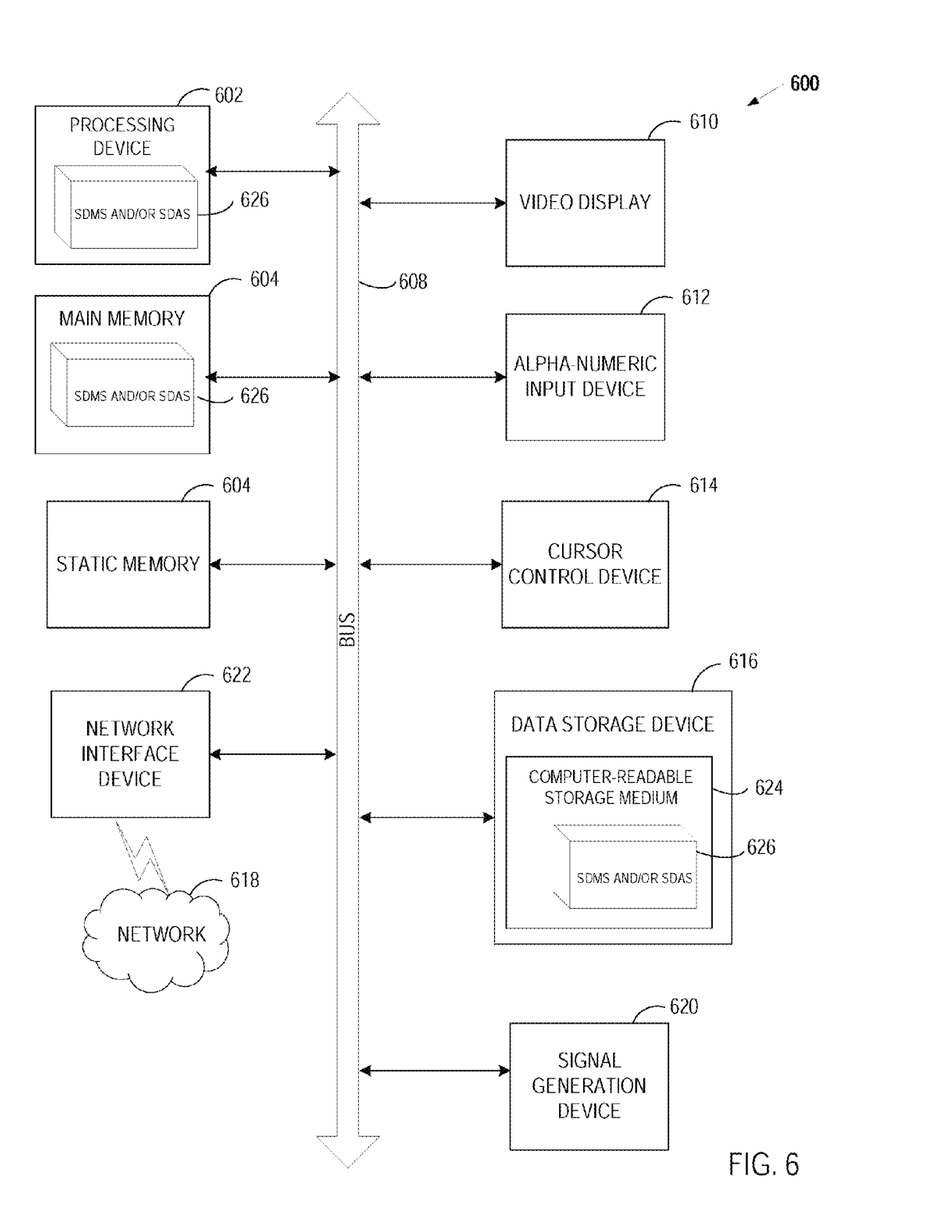
FIG. 6 is a diagram of one embodiment of the security domain data management system.

FIG. 6 is a diagram of one embodiment of a computer system for automatically managing security domain information and for providing the high availability of the security domain information. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a secondary memory 616 (e.g., a data storage device in the form of a drive unit, which may include fixed or removable computer-readable storage medium), which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the Security Domain Management System (SDMS) and/or Security Domain Access System (SDAS) 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions (e.g., the SDMS and/or SDAS 626) embodying any one or more of the methodologies or functions described herein. The SDMS and/or SDAS 626 may also reside, completely or at least partially, within the main memory 604 and/or within the processing device 602 during execution thereof by the computer system 600, the main memory 604 and the processing device 602 also constituting machine-readable storage media. The SDMS and/or SDAS 626 may further be transmitted or received over a network 618 via the network interface device 622.

The computer-readable storage medium 624 may also be used to store the SDMS and/or SDAS 626 persistently. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The SDMS and/or SDAS 626, components and other features described herein (for example in relation to FIG. 2) can be implemented as discrete hardware components or integrated in the functionality of hardware components such as ASICS, FPGAs, DSPs or similar devices. In addition, the SDMS and/or SDAS 626 can be implemented as firmware or functional circuitry within hardware devices. Further, the SDMS and/or SDAS 626 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "selecting," "forwarding," "determining," "storing," "adding," "replicating," "removing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for providing the high availability of the security domain information and for automatically managing security domain information has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
receiving a request to change an availability of a public key infrastructure (PKI) subsystem of a plurality of subsystems providing PKI services, the request comprising credentials to access one or more of a plurality of domain managers managing the plurality of PKI subsystems;
selecting, by a processing device, one of the plurality of domain managers to change the availability of the PKI subsystem of the plurality of PKI subsystems in view of the credentials and availability of the plurality of domain managers; and
forwarding, by the processing device, the request to change the availability of the PKI subsystem of the plurality of PKI subsystems to the selected one of the plurality of domain managers.

2. The method of claim 1, wherein selecting comprises:
determining which of the plurality of domain managers servers correspond to the credentials in the request;
identifying which of the plurality of domain managers that correspond to the credentials are available; and selecting one of the available domain managers.

3. The method of claim 1, further comprising:
storing, by the plurality of domain managers, security data for the plurality of PKI subsystems in a plurality of Lightweight Directory Access Protocol (LDAP)-based databases, wherein the security data is replicated amongst the LDAP-based databases in a replication domain when the security data is changed in at least one of the plurality of LDAP-based databases.

4. The method of claim 1, wherein the change comprises adding a certificate subsystem server to the plurality of PKI subsystems.

5. The method of claim 4, further comprising:
adding, by the selected domain manager, an entry to an LDAP-based database that corresponds to the selected domain manager; and
replicating, by the selected domain manager, the addition to a plurality of LDAP-based databases.

6. The method of claim 1, wherein the change comprises removing a certificate subsystem server from the plurality of PKI subsystems.

7. The method of claim 6, further comprising:
removing, by the selected domain manager, an entry from an LDAP-based database that corresponds to the selected domain manager; and
replicating, by the selected domain manager, the removal to a plurality of LDAP-based databases.

8. The method of claim 1, wherein a request is to view a topology of the plurality of PKI subsystems.

9. The method of claim 1, wherein the credentials comprise a user name and password to access one of the plurality of domain managers.

10. The method of claim 1, wherein the plurality of domain managers comprises a plurality of certificate authority (CA) servers, the plurality of CA servers comprising at least one of a root CA server or a clone of the root CA server.

11. The method of claim 1, wherein the plurality of PKI subsystems are grouped in a security domain.

12. The method of claim 1, wherein the plurality of PKI subsystems comprises at least one of a Certificate Authority (CA) subsystem, a Key Recovery Authority (KRA) subsystem, an Online Certificate Status Responder (OCSP) subsystem, a Registration Authority (RA) subsystem, a Token Key Service (TKS) subsystem to format tokens, or a Token Processing System (TPS).

13. A non-transitory computer-readable storage medium including instructions that, when executed by a processing device, cause the processing device to perform operations comprising:
receiving a request to change an availability of a public key infrastructure (PKI) subsystem of a plurality of subsystems providing PKI services, the request comprising credentials to access one or more of a plurality of domain managers managing the plurality of PKI subsystems;
selecting one of the plurality of domain managers to change the availability of the PKI subsystem of the plurality of PKI subsystems in view of the credentials and availability of the plurality of domain managers; and
forwarding the request to change the availability of the PKI subsystem of the plurality of PKI subsystems to the selected one of the plurality of domain managers.

14. The non-transitory computer-readable storage medium of claim 13, wherein selecting comprises:
determining which of the plurality of domain managers correspond to the credentials in the request;
identifying which of the plurality of domain managers that correspond to the credentials are available; and
selecting one of the available domain managers.

15. The non-transitory computer-readable storage medium of claim 13, the operations further comprising:
storing, by the plurality of domain managers, security data for the plurality of PKI subsystems in a plurality of Lightweight Directory Access Protocol (LDAP)-based databases, wherein the security data is replicated amongst the LDAP-based databases in a replication domain when the domain data is changed in at least one of the plurality of LDAP-based databases.

16. The non-transitory computer-readable storage medium of claim 13, wherein the change comprises adding a certificate subsystem server to the plurality of PKI subsystems.

17. The non-transitory computer-readable storage medium of claim 16, the operations further comprising:
adding, by the selected domain manager, an entry to an LDAP-based database that corresponds to the selected domain manager; and
replicating, by the selected domain manager, the addition to a plurality of LDAP-based databases.

18. The non-transitory computer-readable storage medium of claim 13, wherein the change comprises removing a certificate subsystem server from the plurality of PKI subsystems.

19. The non-transitory computer-readable storage medium of claim 18, the operations further comprising:
removing, by the selected domain manager, an entry from an LDAP-based database that corresponds to the selected domain manager; and
replicating, by the selected domain manager, the removal to a plurality of LDAP-based databases.

20. The non-transitory computer-readable storage medium of claim 13, wherein the request is to view a topology of the plurality of PKI subsystems.

21. A system comprising:
a plurality of persistent storage units to store security domain data describing an availability of a plurality of public key infrastructure (PKI) subsystems providing PKI services, wherein one or more of the plurality of persistent storage units store credentials to access one of a plurality of domain managers managing the plurality of PKI subsystems; and
a domain manager selector, comprising a processing device, and operatively coupled to the one or more of the plurality of persistent storage units, the domain manager selector to select one of the plurality of domain managers to receive one or more requests to change the availability of a PKI subsystem of the PKI subsystems in view of the credentials and availability of the plurality of domain managers, change the availability of the PKI subsystem of the PKI subsystems, and replicate the change to the plurality of persistent storage units.

22. A networking device comprising:
a persistent storage unit to store credentials to access one or more of a plurality of domain managers managing a plurality of public key infrastructure (PKI) subsystems providing PKI services; and
a domain manager selector, comprising a processing device, coupled to the persistent storage unit to receive a request to change an availability of a PKI subsystem of the plurality of PKI subsystems, select one of the plurality of domain managers to change the availability of the PKI subsystem of the plurality of PKI subsystems in view of an availability of the domain managers, credentials in the request, and the credentials in the persistent storage unit, and forward the request to the selected domain manager.

* * * * *